(12) United States Patent
Novak et al.

(10) Patent No.: US 11,695,802 B2
(45) Date of Patent: Jul. 4, 2023

(54) INTEGRATED CONTROL FRAMEWORKS

(71) Applicant: JPMORGAN CHASE BANK, N.A., New York, NY (US)

(72) Inventors: Mark F. Novak, Newcastle, WA (US); Todd Hrycenko, Bellevue, WA (US); Roy E. Crowder, III, Pickerington, OH (US); Marshall C. McCain, North Richland Hills, TX (US)

(73) Assignee: JPMORGAN CHASE BANK, N.A., New York, NY (US)

(*) Notice: Subject to any disclaimer, the term of this patent is extended or adjusted under 35 U.S.C. 154(b) by 248 days.

(21) Appl. No.: 16/998,907

(22) Filed: Aug. 20, 2020

(65) Prior Publication Data

US 2021/0058430 A1   Feb. 25, 2021

Related U.S. Application Data

(60) Provisional application No. 62/889,332, filed on Aug. 20, 2019.

(51) Int. Cl.
*H04L 9/40* (2022.01)

(52) U.S. Cl.
CPC .................................. *H04L 63/20* (2013.01)

(58) Field of Classification Search
CPC ... H04L 63/20; H04L 63/105; H04L 63/1425; H04L 63/1433
USPC .......................................................... 726/1
See application file for complete search history.

(56) References Cited

U.S. PATENT DOCUMENTS

| 2019/0102162 A1* | 4/2019 | Pitre | H04L 63/102 |
| 2019/0294613 A1* | 9/2019 | Sullivan | G06F 16/2455 |
| 2019/0342315 A1* | 11/2019 | Smelov | H04L 63/20 |

* cited by examiner

*Primary Examiner* — Kambiz Zand
*Assistant Examiner* — Aubrey H Wyszynski
(74) *Attorney, Agent, or Firm* — Greenberg Traurig LLP (57) ABSTRACT

Integrated controls frameworks are disclosed. In one embodiment, in an information processing apparatus comprising at least one computer processor, a method for using an integrated control framework for an application comprising a plurality of application modules may include: (1) defining an application profile, an application model, and a target cloud environment for an application; (2) identifying a plurality of security, resiliency, and controls requirements for the target cloud environment; (3) configuring a plurality of security controls for the application based on the plurality of security, resiliency, and controls requirements; and (4) deploying the security controls to the target cloud environment.

18 Claims, 3 Drawing Sheets

INTEGRATED CONTROL FRAMEWORKS

RELATED APPLICATIONS

This application claims priority to, and the benefit of, U.S. Provisional Patent Application Ser. No. 62/889,332 filed Aug. 20, 2019, the disclosure of which is hereby incorporated, by reference, in its entirety.

BACKGROUND OF THE INVENTION

1. Field of the Invention

The present disclosure generally relates to integrated control frameworks.

2. Description of Related Art

Compliance with relevant jurisdictional, industry body, and other regulatory standards, including all appropriate inline, preventive, detective, and reactive controls, is normally not within the scope of regular application development work. Indeed, requiring developers to identify all applicable rules, regulations, policies, and standards, and compliance with those rules, regulations, policies, and/or standards would be overwhelming.

SUMMARY OF THE INVENTION

Integrated controls frameworks are disclosed. In one embodiment, in an information processing apparatus comprising at least one computer processor, a method for using an integrated control framework for an application comprising a plurality of application modules may include: (1) defining an application profile, an application model, and a target cloud environment for an application; (2) identifying a plurality of security, resiliency, and controls requirements for the target cloud environment; (3) configuring a plurality of security controls for the application based on the security, resiliency, and controls requirements; and (4) deploying the security controls to the target cloud environment.

In one embodiment, the method may further include logging supporting information and results of relevant decisions for the deployed security controls.

In one embodiment, the application model may specify at least one of a regulatory standard, an industry standard, and a best practice for the application.

In one embodiment, the application model may be configured to be programmatically analyzed.

In one embodiment, the application model may include a directed graph having vertices and edges, wherein the vertices represent at least one of data flow endpoints, compute instances, storage instances, network topology, and auto scaling units, and the edges represent at least one of data flow, replication, failover, containment, and trust.

In one embodiment, the plurality of security, resiliency, and controls requirements for the target cloud environment may be identified using a catalog of control requirements for at least one of the target cloud environment, a jurisdiction, an industry standard, and a best practice.

In one embodiment, the step of identifying a plurality of security, resiliency, and controls requirements for the target cloud environment may include, for each application module: a controls selection engine walking the application model and identifying a list of inline, preventive, detective and reactive controls applicable to the application profile; configuring the selected controls to implement a corresponding set of inline, preventive, detective and reactive functions, based on the target cloud environment, the application model and the application profile; and deploying the configured controls to the target cloud environment.

In one embodiment, the method may further include a controls parameterization engine receiving at least one control procedure for the identified controls; and the controls parameterization engine selecting a strongest of the at least one control procedure.

In one embodiment, the method may further include applying at least one of the preventive controls to a deployment pipeline for the application. Deployment of the application may be terminated in response to one of the preventive controls being triggered.

In one embodiment, the method may further include generating target environment-specific scripts and code snippets and injecting the scripts and code snippets at appropriate parts of a continuous integration/continuous deployment pipeline; and performing runtime validation on the application modules using detective tools to identify a deviation from an expected configuration or behavior.

In one embodiment, the method may further include providing access to the results and associated evidence via a user interface according to a user role, wherein different user roles have different access to the log and associated evidence.

According to another embodiment, an integrated control framework may include an application model layer that defines an application profile, an application model, and a target cloud environment for an application, the application comprising a plurality of modules; a control selection and parameterization layer that includes a standards catalog comprising a plurality of controls; a controls catalog comprising control requirements for at least one of the target cloud environment, a jurisdiction, an industry standard, and a best practice; and a controls selection engine that identifies inline, preventive, detective and reactive controls for the application based on the application profile and application module; a control configuration and deployment layer that configures the selected controls to implement the list of inline, preventive, detective and reactive controls for the application based on the target cloud environment and the application model or the application profile that includes a deployment pipeline that applies preventive controls and deploys an application that passes the preventive control; a runtime validation module that deploys the detective controls on the application modules to identify a deviation from an expected configuration or behavior; an inline control module that deploys inline controls; a runtime response module comprising reactive controls; and a control-specific validation module that triggers a control-specific response module that applies a reactive control; and an evidencing, visualization, and alerting layer that may include an event sink that receives control events from the inline controls and the control-specific response module; an alerting module that generates an alert in response to a control event; an evidencing repository that logs supporting information and results of relevant decisions for the deployed security controls; and a presentation layer that provides access to evidencing repository.

In one embodiment, the application model may specify at least one of a regulatory standard, an industry standard, and a best practice for the application.

In one embodiment, the application model is configured to be programmatically analyzed.

In one embodiment, the application model may include a directed graph having vertices and edges, wherein the vertices represent at least one of data flow endpoints, compute instances, storage instances, network topology, and auto scaling units, and the edges represent at least one of data flow, replication, failover, containment, and trust.

In one embodiment, the deployment pipeline may generate target environment-specific scripts and code snippets and injecting the scripts and code snippets at appropriate parts of a continuous integration/continuous deployment pipeline.

In one embodiment, the presentation layer may provide access to the results and associated evidence via a user interface according to a user role, wherein different user roles have different access to the log and associated evidence.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are generally directed to an integrated controls framework.

A typical cloud application consists of several building blocks, each of which must be secured in its own way. The process of securing an application starts with the choice of platform and involves every aspect of its development, deployment and operation—as it runs on endpoints, exposes network interfaces, handles data, authenticates and authorizes users and services, and interacts with key management facilities.

In embodiment, controls may be applied to most of the operations. These controls, while easily classified as preventive, detective, or reactive, are deployed and configured in ways that are specific to the type of application module in question as well as the level of sensitivity associated with keys and data handled by the application. The controls may produce logs through a common log generation and capture mechanism, which places the generated data in a data lake. Individual "panes of glass" provide users (e.g., auditors, compliance officers, application owners, risk officers, etc.) with visibility into the data lake, and may be specific to each function.

Embodiments may consider security controls across a plurality of application modules, such as other modules with which a module may interact. For example, if a RDS database is being backed up to a S3 bucket, if the RDS database and S3 bucket have a common entity with write access to both the RDS database and S3 bucket, this may be considered a security issue as compromise of the common entity could result in data destruction without a backup.

Figure 1:
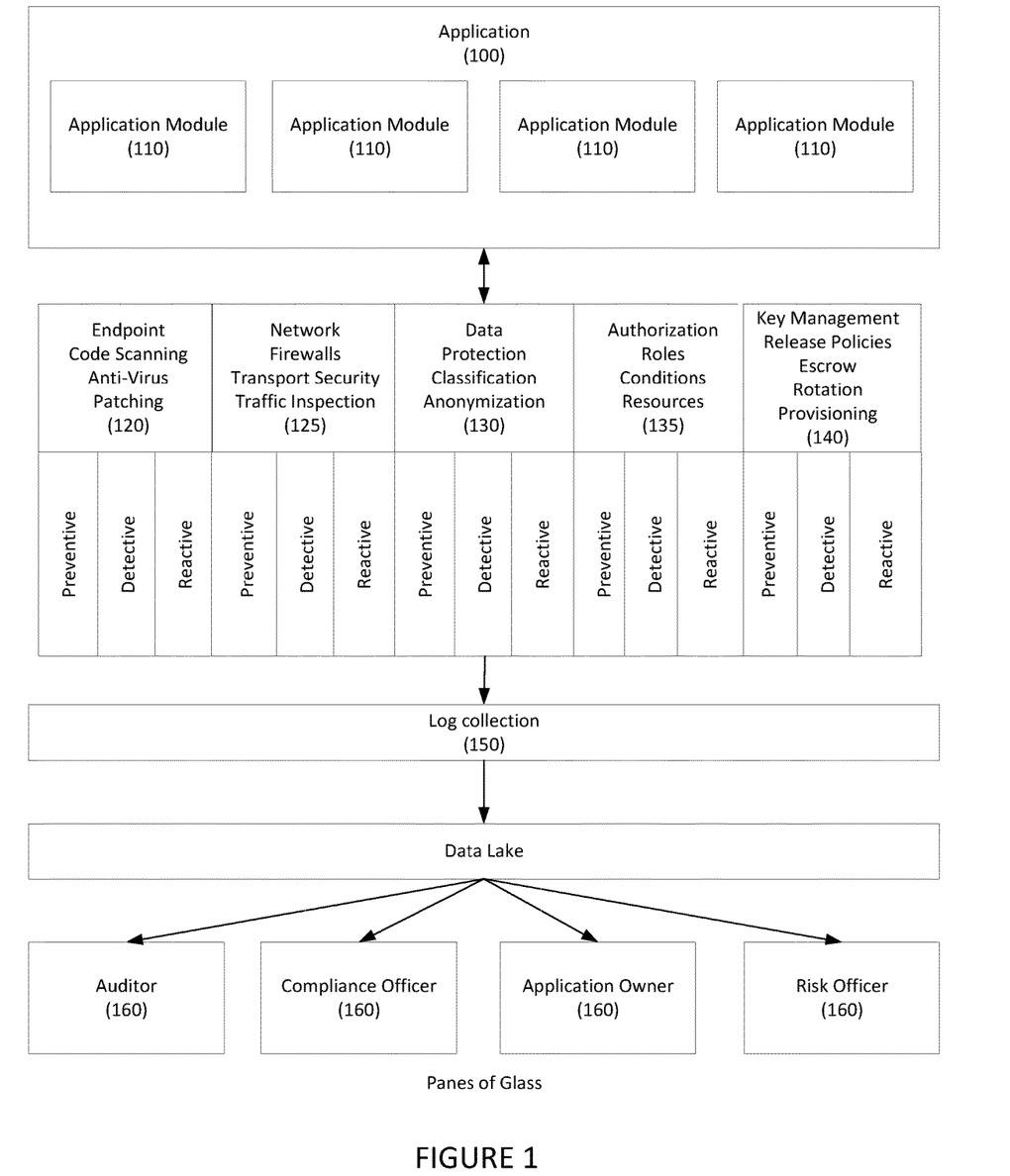
FIG. 1 depicts an integrated control frameworks architecture is disclosed according to one embodiment.

Referring to FIG. 1, an integrated control frameworks architecture is disclosed according to one embodiment. Application 100 may be deployed in a cloud environment, and may include a plurality of application modules 110. Examples of application modules 110 may include load balancers, individual virtual machines, auto-scaling groups, data stores, certificate authorities, etc. Modules 110 may also include application 100, or modules 110 may be external to application 110 and may be used or accessed by application 110. Other types of modules 110 may be used as is necessary and/or desired.

Application may execute on endpoint 120, and may require different types of security. For example, each module 110 may require one or more of network security 125, data protection security 130, user authentication security 135, key management security 140, etc. Other modules may not require any type of security. For example, an auto-scaling module may not provide security value, but it supports increased reliability under load. An elastic load balancer module may provide network stability under load, and may also terminate secure channels.

Each type of security requirement 120, 125, 130, 135, 140, may include security controls, such as preventive, detective, and reactive. For example, endpoint security 120 may involve the following controls: preventive (e.g., enforcing use of approved images, source code scanning for vulnerabilities, embedded credentials, banned APIs, etc.); detective (e.g., anti-virus, detecting unpatched software); and reactive (e.g., shutting down offending nodes when vulnerabilities are detected). Network security 125 may involve a different set of controls in the same categories. For example, network controls may include preventive (e.g., ensuring that no application is deployed with a misconfigured firewall or bad TLS configuration); inline (e.g., ensuring that Internet facing communications are properly TLS terminated utilizing appropriate TLS flavors and ciphers); detective (e.g., periodic port scans, validation of application firewall rules); and reactive (e.g., returning offending nodes to appropriate configuration or shutting them down, throttling and DDoS protection).

Data protection security 130 may take the following exemplary forms: preventive (e.g., ensuring that no application can get deployed that does not classify its data and/or does not use the approved data protection technologies, ensuring that within the application, data classifications are honored for purposes of e.g., encryption at rest and redaction as appropriate), inline (e.g., ensuring that PII is properly redacted before entering logs), detective (e.g., ensuring that data is not stored in the clear outside its approved localities, ensuring that S3 buckets are never set to "public" and that encryption at rest is enabled, ensuring that data containing PII are properly redacted inside logs), and reactive (e.g., revering public S3 buckets to protected configuration, destroying unencrypted data that exists outside their authorized locations, destroying logs that contain unredacted PII).

For every security technology utilized by application 100 (endpoint, network, storage, etc.), embodiments allow for a superimposition of several types of security requirements. First, there may be base requirements that apply universally, such as for AWS, "no open S3 buckets" when it comes to storage. Next are application-specific requirements that may be fine-tuned by the application owners (e.g., data classification). Finally, there are standards that apply to some applications but not to others (e.g., some applications are required to be PCI compliant, while others are not). The security requirements may be cumulative. The resulting set of requirements may be provided to a cloud environment-specific renderer to generate output specific to the cloud environment into which the application is being deployed.

The activities may be collected in a log collection 150 which may be collected and provided to data lake 155. Using panes of glass, users 160, such as auditors, compliance officers, application owners, risk offers, etc. may access the data in the data logs.

Embodiments provide a regulatory framework that may impose a set of additional requirements across the entire application stack. For example, an application that has to be PCI compliant may superimpose a set of additional requirements on the entire control spectrum.

Figure 2:
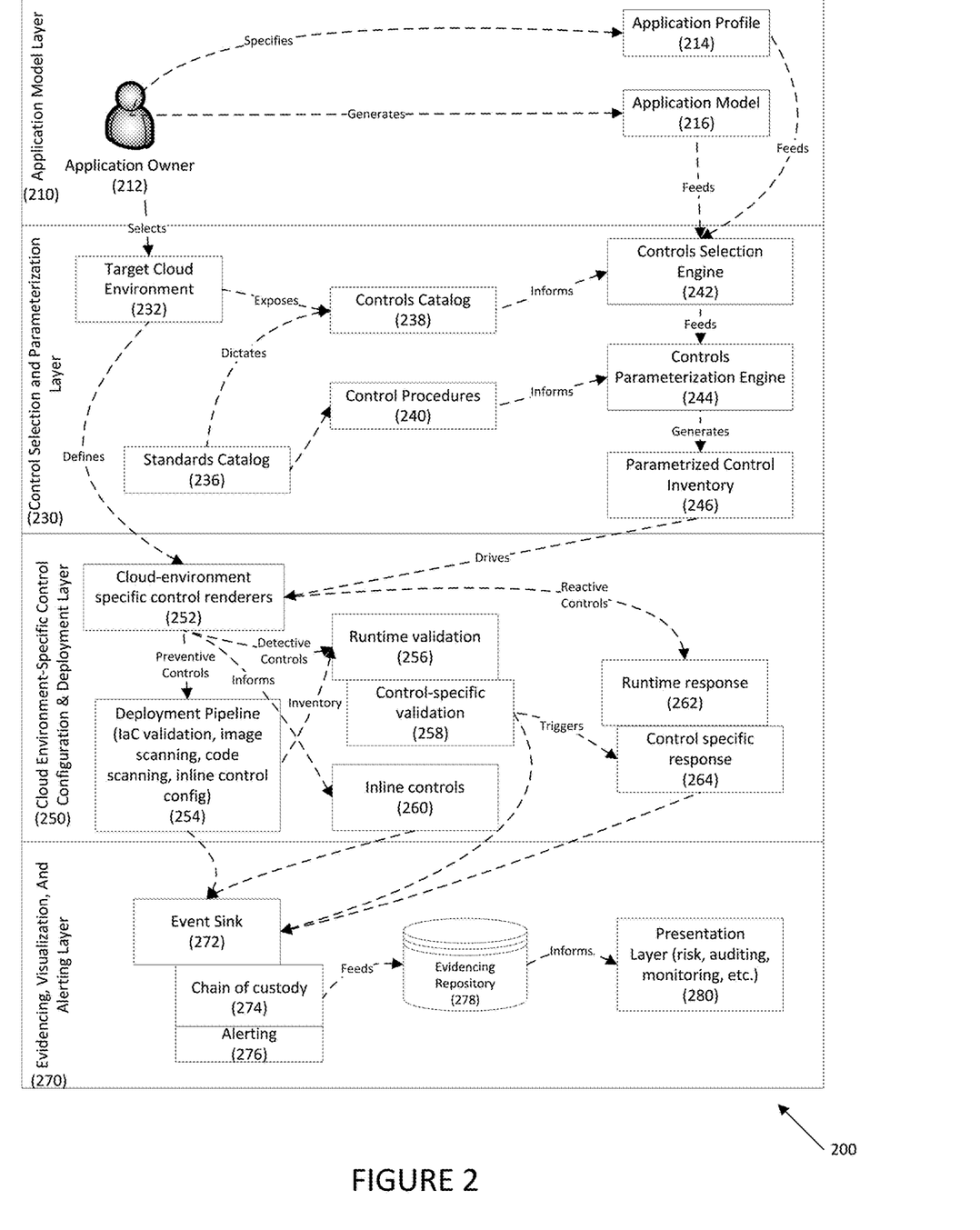
FIG. 2 depicts a high-level architectural diagram for an integrated controls framework according to an embodiment.

Referring to FIG. 2, a high-level architectural diagram for an integrated controls framework is provided according to one embodiment. Architecture 200 may include four main layers, and each layer may depend on the layer above it. In one embodiment, the four layers may include application model layer 210, control selection and parameterization layer 230, cloud environment-specific control configuration and deployment layer 250, and evidencing, visualization, and alerting layer 270. It should be appreciated that the names are illustrative only and do not limit the embodiment.

Application model layer 210 is the topmost layer of the architecture. In application model layer 210, the application may be "defined" by application owner 212—a process that may have three outputs: (1) application profile 214; (2) application model 216; and (3) a target cloud environment 232, which may be specified by the application owner or developer. Application profile 214 may specify general (as opposed to module-specific) information about the application, such as: which geographic region(s) it will operate in; which line of business it belongs to; what regulatory regimes and industry standard(s) it is subject to (e.g., GDPR, PCI, etc.); and best practices.

Application model 216 may represent the decomposition of the application into its constituent blocks (e.g., web interface, compute node, storage, etc.) with data flows and data classification defined for each flow between the building blocks. Application model 216 may be a directed graph with vertices representing data flow endpoints (e.g., an entity to or from which data may flow, such as application firewalls, storage buckets, compute nodes, etc.) to which security policies and controls can be applied, and directed edges representing data flows, labeled according to the data they are comprised of. Examples of vertices include compute instances, storage instances, network topology, auto scaling units, etc. Edges may represent data flows, and may also represent other relationships between nodes, such as replication, failover, containment, trust, etc. Application model 216 may be capable of being programmatically analyzed.

Once the job of application model layer 210 is finished, the system produces everything required by the control selection and parameterization layer below it.

Control selection and parameterization layer 230 may produce a cloud environment-specific inventory of parameterized controls corresponding to the application. Layer 230 may be target cloud environment 232, which may be chosen by the application owner and represents the destination environment into which the application is to be deployed.

Each cloud environment 232 may expose controls catalog 238 that may include cloud environment-specific control requirements dictated by various standards. In one embodiment, controls catalog 238 may include control definitions that have been automated by cloud environment 232.

In one embodiment, controls catalog 238 may be cloud environment-independent. The implementation of controls in the catalog may vary by cloud environment, but the set of controls that must be applied—controls catalog 238—may be a centralized entity that may be specialized for each cloud environment, but is cross-cloud environment in nature. For example, standards catalog 236 may identify industry standards for controls catalog 238.

Controls selection engine 242 may "walk" application model 216, and for each vertex (i.e., securable module) in the graph, arrive at the list of all preventive, detective and reactive controls applicable to that module, given the application profile (e.g., a collection of application-specific properties, including, for example, the application model, regulations the application is subject to, which jurisdictions it operates in, which industry standards it must comply with, which cloud platform(s) it is destined for, etc.). Controls selection engine 242 may also pinpoint missing inline modules. For example, it may identify that a "redactor" module is missing when a compute node writes PII to the log that needs to be redacted per GDPR. In one embodiment, only the controls inside the controls catalog 238 may be deployed and evidenced automatically.

Controls selection engine 242's output may feed into controls parameterization engine 244, along with application profile 214 and the dataflows from application model 216. Controls selection engine 242 may query one or more controls catalogs 238 for control procedures for each module type and its associated data types. In doing so, it may use all available information, including application profile 214.

Controls parameterization engine 244 may query controls procedures 240 for one or more control procedure. In one embodiment, control procedures are set of steps that one takes in order to secure something, such as ensuring that security requirements are met, for an individual module or a collection of modules.

In one embodiment, once control procedures are identified, the strongest one may be selected. For example, if there are regional requirements for encrypting data at rest, which may be stronger or weaker than the baseline requirement, the stronger one may be selected.

Parameterized control inventory 246 is the result of the determination of which controls apply (e.g., data protection at rest for storage instances, authentication for endpoints, integrity and confidentiality for transports, etc.), the specific requirements (e.g., how strong is the encryption, what ciphers are allowed, which authentication methods and factors, etc.) etc.

For example, a particular application may not be subject to the same regulations as its peers, in which case the controls catalog may contain application-specific exceptions based on, for example, business requirements, risk tolerance, etc.

The output of control selection and parameterization layer 230 may be an inventory of controls thus distilled for the given application from all the available inputs. This output contains, for each module of the application, a set of controls that apply to that application module and the parameters to each control (e.g., strength of encryption, key management requirements, specifics of the code scanning policy, etc.). In one embodiment, the output may not provide the exact cloud environment-specific "Infrastructure as Code" instructions to configure and deploy each control. Instead, that process, referred to as "rendering," may be performed by the next layer.

As used herein, a module of an application may be a unit of data processing or storage, which can be standalone (e.g., S3 bucket or TLS load balancer) or part of a "group of cattle" (e.g., a web server). In the latter case, all application modules may be considered to be identical and indistinguishable from each other. Note that a container and its associated sidecars may be considered to be separate application modules.

Cloud environment-specific control configuration and deployment layer 250 may convert the inventory of parameterized controls into cloud environment-specific deployment of properly configured controls using, for example, cloud-environment specific control renderers 252. Code scanning, image scanning, infrastructure-as-code instructions and corresponding validation logic may all be inserted into the appropriate pieces in the CI/CD pipelines. Application deployment manifests may be affected by, for example, inline control configuration parameters.

Runtime validation 256 may include "detective" tools that may be given an inventory of application modules to monitor, and the associated minimum requirements to monitor them against, using control-specific detective logic. If these detective controls detect a deviation from an expected configuration, or the violation of a compliance requirement, control-specific "reactive" response logic 264 may be triggered by runtime response 262.

Control-specific validation tools 258 may validate control-specific security settings. Examples include reviewing endpoints and ensure they continue having the right key lengths and ciphers, that log files are free of PII, etc. The actions taken are specific to the type of problem encountered. For example, a vulnerable internet exposed endpoint might need to be shut down but only if it handles highly classified data (a matter of policy). A TLS endpoint where certificate is nearing expiration may simply be flagged as such and decision on what to do left to administrator—also a matter of policy. If encryption at rest is turned off for a module, an appropriate action might be to turn it back on and raise an alert.

Inline controls 260 may be a control that is performing a security function as a part of the application, and not as an external monitoring tool. An example of an inline control is a logging sidecar that monitors a logging stream for Personal Identifiable Information (PII) and filters it out, ensuring that logs are PII-free. Another example is a Web Application Firewall that ensures ensuring that traffic through it conforms with a policy.

In one embodiment, cloud environment-specific control configuration and deployment layer 250 may configure the controls for deployment. For each control and its associated parameters, the cloud environment-specific control configuration and deployment layer may generate platform-specific scripts and code snippets that are injected into the appropriate parts of the CI/CD pipeline, and/or configure associated platform-specific control mechanisms to perform the corresponding control-specific activities.

Once the controls are configured and deployed, the controls may provide evidence of their operation by logging results (control identification, success or failure of each operation), as well as supporting evidence.

Evidencing, visualization and alerting layer 270 may receive the output of deployment pipeline 254, runtime control-specific validation 258, inline controls 260, and control-specific response 266. In one embodiment, alerting module 276 may generate an alert in response to a predetermined condition being breached.

The outputs may be deposited to a selectable location, such as event sink 272. The destination may vary as is necessary and/or desired. A separate "chain of custody" architecture 274 may preserve the integrity and provenance of each piece of evidence, protecting its contents according to appropriate data-specific policies, and to ensuring that no piece of evidence is lost. For example, such evidence may be stored in a repository, such as evidencing repository 278.

Presentation layer 280 may provide an interface for accessing evidence in evidencing repository 278 for risk monitoring, auditing, operations monitoring, etc.

The evidence may include a log of supporting information and results of relevant decisions. Examples may include preventive (e.g., code scan performed (passed or failed)), inline (e.g., "attachment scanned, found to be safe/unsafe"), detective (e.g., "log checked for PII, some found/none found"), and responsive (e.g., "PII found in log: entry deleted/log deleted/alert raised"). Embodiments may provide complete visibility into the operations of the controls.

Figure 3:
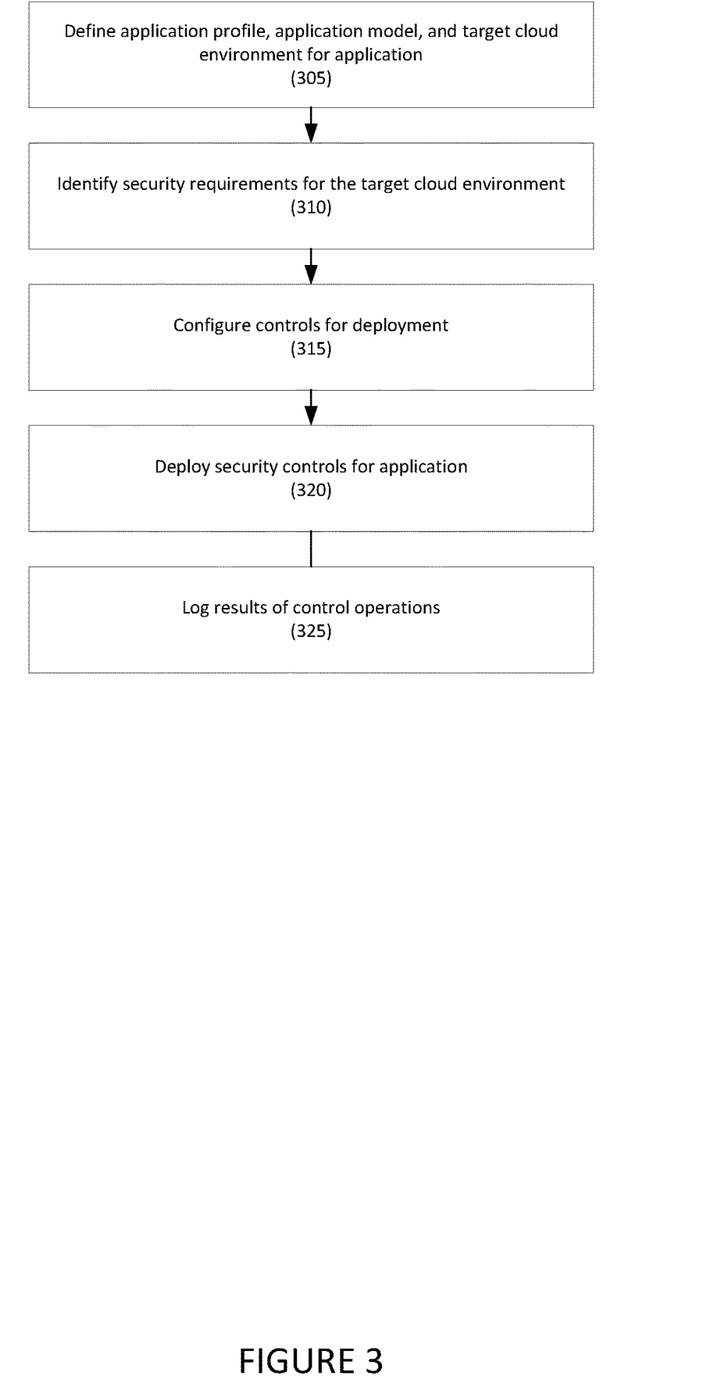
FIG. 3 depicts an exemplary method for providing an integrated controls framework according to an embodiment.

Referring to FIG. 3, an exemplary method for providing an integrated controls framework is provided according to one embodiment.

In step 305, an application's application profile, application model, and target cloud environment may be defined. In one embodiment, this may include the functions performed by the application model layer of FIG. 2.

In step 310, the general security requirements, specific security requirements, and application-specific security requirements for the cloud environment in which an application may execute may be identified using for example, a controls selection engine. This may include the functions performed by the control selection and parameterization layer in FIG. 2.

In step 315, the controls may be configured for deployment. In one embodiment, this may include the functions performed by the cloud environment-specific control configuration and deployment layer.

In step 320, the controls may be deployed to the environment.

In step 325, once the controls are configured and deployed, the controls may provide evidence of their operation by logging results (control identification, success or failure of each operation), as well as supporting evidence. In one embodiment, this may include the functions performed by the evidencing, visualization, and alerting layer.

As described herein, embodiments facilitate the assessment of an application's security holistically in addition to providing controls for each application module individually. For example, as discussed above, a database and its backup should not share administrative credentials, as compromise of such might destroy both the database and its backup.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. An integrated control framework, comprising:
an application model layer that defines an application profile, an application model, and a target cloud environment for an application, the application comprising a plurality of application modules;
a control selection and parameterization layer comprising:
a standards catalog comprising a plurality of controls;
a controls catalog comprising control requirements for at least one of the target cloud environment, a jurisdiction, an industry standard, and a best practice; and
a controls selection engine that identifies a list of inline, preventive, detective and reactive controls for the application based on the application profile and an application module of the plurality of application modules;
a control configuration and deployment layer that configures selected controls from the plurality of controls to implement the list of inline, preventive, detective and reactive controls for the application based on the target cloud environment and the application model or the application profile, comprising:
a deployment pipeline that applies preventive controls and deploys the application, wherein the application passes the preventive controls;
a runtime validation module that deploys the detective controls on the application module to identify a deviation from an expected configuration or behavior;
an inline control module that deploys inline controls;
a runtime response module comprising reactive controls; and
a control-specific validation module that triggers a control-specific response module that applies a reactive control; and
an evidencing, visualization, and alerting layer comprising:
an event sink that receives control events from the inline controls and the control-specific response module;
an alerting module that generates an alert in response to a control event;
an evidencing repository that logs supporting information and results of decisions for the deployed controls to a log; and
a presentation layer that provides access to the evidencing repository.

2. The integrated control framework of claim 1, wherein the application model specifies at least one of a regulatory standard, an industry standard, and a best practice for the application.

3. The integrated control framework of claim 1, wherein the application model is configured to be programmatically analyzed.

4. The integrated control framework of claim 1, wherein the application model comprises a directed graph having vertices and edges, wherein the vertices represent at least one of data flow endpoints, compute instances, storage instances, network topology, and auto scaling units, and the edges represent at least one of data flow, replication, failover, containment, and trust.

5. The integrated control framework of claim 1, wherein the deployment pipeline generates target environment-specific scripts and code snippets and injects the scripts and code snippets at parts of a continuous integration/continuous deployment pipeline.

6. The integrated control framework of claim 1, wherein the presentation layer provides access to the results and associated evidence via a user interface according to a user role, wherein different user roles have different access to the log and the associated evidence.

7. A method, comprising:
defining, in an application model layer, an application profile, an application model, and a target cloud environment for an application, the application comprising a plurality of application modules;
providing a standards catalog comprising a plurality of controls;
providing a controls catalog comprising control requirements for at least one of the target cloud environment, a jurisdiction, an industry standard, and a best practice;
identifying, in a control selection engine, a list of inline, preventive, detective and reactive controls for the application based on the application profile and an application module of the plurality of application modules;
configuring, in a control configuration and deployment layer, selected controls from the plurality of controls to implement the list of inline, preventive, detective and reactive controls for the application based on the target cloud environment and the application model or the application profile, wherein the control configuration and deployment layer comprises:
a deployment pipeline that applies preventive controls and deploys the application, wherein the application passes the preventive controls;
a runtime validation module that deploys detective controls on the application module to identify a deviation from an expected configuration or behavior;
an inline control module that deploys inline controls;
a runtime response module comprising reactive controls; and
a control-specific validation module that triggers a control-specific response module that applies a reactive control; and
providing an evidencing, visualization, and alerting layer comprising:
an event sink that receives control events from the inline controls and the control-specific response module;
an alerting module that generates an alert in response to a control event;
an evidencing repository that logs supporting information and results of decisions for the deployed controls to a log; and
a presentation layer that provides access to the evidencing repository.

8. The method of claim 7, wherein the application model specifies at least one of a regulatory standard, an industry standard, and a best practice for the application.

9. The method of claim 7, wherein the application model is configured to be programmatically analyzed.

10. The method of claim 7, wherein the application model comprises a directed graph having vertices and edges, wherein the vertices represent at least one of data flow endpoints, compute instances, storage instances, network topology, and auto scaling units, and the edges represent at least one of data flow, replication, failover, containment, and trust.

11. The method of claim 7, wherein the deployment pipeline generates target environment-specific scripts and code snippets, and comprising:
injecting the scripts and code snippets at parts of a continuous integration/continuous deployment pipeline.

12. The method of claim 7, wherein the presentation layer provides access to the results and associated evidence via a user interface according to a user role, wherein different user roles have different access to the log and the associated evidence.

13. A non-transitory computer readable storage medium, including instructions stored thereon, which instructions, when read and executed by one or more computer processors, cause the one or more computer processors to perform steps comprising:
defining, in an application model layer, an application profile, an application model, and a target cloud environment for an application, the application comprising a plurality of application modules;
providing a standards catalog comprising a plurality of controls;
providing a controls catalog comprising control requirements for at least one of the target cloud environment, a jurisdiction, an industry standard, and a best practice;
identifying, in a control selection engine, a list of inline, preventive, detective and reactive controls for the application based on the application profile and an application module of the plurality of application modules;
configuring, in a control configuration and deployment layer, selected controls from the plurality of controls to implement the list of inline, preventive, detective and reactive controls for the application based on the target cloud environment and the application model or the application profile, wherein the control configuration and deployment layer comprises:
a deployment pipeline that applies preventive controls and deploys the application, wherein the application passes the preventive controls;
a runtime validation module that deploys detective controls on the application module to identify a deviation from an expected configuration or behavior;
an inline control module that deploys inline controls;
a runtime response module comprising reactive controls; and
a control-specific validation module that triggers a control-specific response module that applies a reactive control; and
providing an evidencing, visualization, and alerting layer comprising:
an event sink that receives control events from the inline controls and the control-specific response module;
an alerting module that generates an alert in response to a control event;
an evidencing repository that logs supporting information and results of decisions for the deployed controls to a log; and
a presentation layer that provides access to the evidencing repository.

14. The non-transitory computer readable storage medium of claim 13, wherein the application model specifies at least one of a regulatory standard, an industry standard, and a best practice for the application.

15. The non-transitory computer readable storage medium of claim 13, wherein the application model is configured to be programmatically analyzed.

16. The non-transitory computer readable storage medium of claim 13, wherein the application model comprises a directed graph having vertices and edges, wherein the vertices represent at least one of data flow endpoints, compute instances, storage instances, network topology, and auto scaling units, and the edges represent at least one of data flow, replication, failover, containment, and trust.

17. The non-transitory computer readable storage medium of claim 13, wherein the deployment pipeline generates target environment-specific scripts and code snippets, and comprising:
injecting the scripts and code snippets at parts of a continuous integration/continuous deployment pipeline.

18. The non-transitory computer readable storage medium of claim 13, wherein the presentation layer provides access to the results and associated evidence via a user interface according to a user role, wherein different user roles have different access to the log and the associated evidence.

* * * * *